(12) United States Patent
Djelassi et al.

(10) Patent No.: US 11,360,113 B2
(45) Date of Patent: Jun. 14, 2022

(54) METHOD FOR MEASURING THE SPEED OF ROTATION OF AN AIRCRAFT ENGINE SHAFT, TAKING INTO ACCOUNT THE MEASUREMENT NOISE

(71) Applicant: SAFRAN AIRCRAFT ENGINES, Paris (FR)

(72) Inventors: Cedrik Djelassi, Moissy-Cramayel (FR); Jacques Paul Michel Gauvrit, Moissy-Cramayel (FR); Jean-Francois Jean-Paul Clement Schielin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 269 days.

(21) Appl. No.: 16/622,545

(22) PCT Filed: Jun. 13, 2018

(86) PCT No.: PCT/FR2018/051393
§ 371 (c)(1),
(2) Date: Dec. 13, 2019

(87) PCT Pub. No.: WO2018/229433
PCT Pub. Date: Dec. 20, 2018

(65) Prior Publication Data
US 2021/0148946 A1    May 20, 2021

(30) Foreign Application Priority Data

Jun. 14, 2017 (FR) ...................... 1755343

(51) Int. Cl.
*G01P 3/44* (2006.01)
*G01P 3/489* (2006.01)
*G01P 3/488* (2006.01)

(52) U.S. Cl.
CPC .............. *G01P 3/489* (2013.01); *G01P 3/488* (2013.01)

(58) Field of Classification Search
CPC ................................. G01P 3/489; G01P 3/488
See application file for complete search history.

(56) References Cited

U.S. PATENT DOCUMENTS 5,128,973 A     7/1992  Sasaki et al.
8,836,321 B2 *  9/2014  Sasaki ..................... G01P 3/489
                                                    324/166

(Continued)

FOREIGN PATENT DOCUMENTS

WO    WO 2014/207369 A1    12/2014

OTHER PUBLICATIONS

International Search Report dated Nov. 15, 2018 in PCT/FR2018/051393 filed on Jun. 13, 2018, 2 pages

(Continued)

*Primary Examiner* — Elias Desta
(74) *Attorney, Agent, or Firm* — ObLon, McClelland, Maier & Neustadt, L.L.P.

(57) ABSTRACT

A method for measuring rotation speed of an aircraft engine shaft includes: acquisition of an alternating rotation speed detection signal across terminals of a phonic wheel sensor, conversion of the alternating signal into a square signal; comparison of a plurality of previously-stored square signal period samples to lower and upper period limits, to determine valid samples of a value included between the terminals; if the number of valid samples is greater than a first threshold, determination on the basis of the valid samples of a desired period of the square signal; and at least on the condition that the number of valid samples is less than the first threshold, computation of a plurality of sums of samples, and computation of the average of a set comprising (Continued)

a number of valid period samples and a number of sums from among the plurality of sums of at least two samples.

11 Claims, 7 Drawing Sheets

(56) References Cited

U.S. PATENT DOCUMENTS

| | | | |
|---|---|---|---|
| 8,836,322 B2 * | 9/2014 | Roylance | ................ G01P 3/487 324/174 |
| 2003/0208329 A1 | 11/2003 | Brown et al. | |
| 2004/0158422 A1 | 8/2004 | Brown et al. | |
| 2007/0108969 A1 | 5/2007 | Kurimoto et al. | |
| 2016/0291052 A1 | 10/2016 | Riolo et al. | |

OTHER PUBLICATIONS

International Search Report dated Nov. 15, 2018, in PCT/FR2018/051393, 1 page.

French Search Report dated Feb. 7, 2018, in Patent Application No. 1755343, 2 pages (with English Translation of Category of Cited Documents).

* cited by examiner

METHOD FOR MEASURING THE SPEED OF ROTATION OF AN AIRCRAFT ENGINE SHAFT, TAKING INTO ACCOUNT THE MEASUREMENT NOISE

TECHNICAL FIELD OF THE INVENTION

This invention concerns the accurate measurement of the speed of an aircraft engine.

It is more specifically about taking into account the existence of spurious noise which is added to the desired signal in an unpredictable manner, during the measurement of the rotation speed of an engine shaft by phonic wheel sensor.

OVERVIEW OF THE INVENTION

The accurate detection of the rotation speed of an aircraft engine shaft is necessary, insofar as this information can control the cut-off or the regulation of the engine power supply, for example if the rotation speed or the acceleration exceed a predetermined safety value.

It is well known to measure the rotation speed of a shaft using a variable reluctance sensor associated with a phonic wheel. One may invariably speak of a phonic wheel sensor, or of a variable reluctance sensor. The phonic wheel is arranged in such a way as to form a single part with the shaft. Using a winding, the sensor creates a magnetic field which closes either on an air gap between two teeth of the phonic wheel, or on one tooth of the phonic wheel. Thus, the magnetic flux measured varies as a function of the passing of the teeth of the phonic wheel, in a manner proportional to the phonic wheel rotation speed. The frequency of the alternating voltage thus generated is equal to the frequency of the passing of the teeth of the phonic wheel, itself illustrative of the rotation speed of the shaft, and the amplitude of this alternating voltage is a function of the air gap and the frequency of the signal. The Applicant has described, in the International patent application filed under number WO 2014/207369, a toothed nut which can be screwed around an aircraft engine shaft, for example to mechanically secure this shaft with a ball bearing, the teeth of which can cooperate with a rotation speed sensor operating via this principle. At least a part of the teeth of the nut moreover comprise hollows, preserving the tightening function of the nut while providing the greatest number of intervals of deficit in the part to permit the accurate measurement of the rotation speed of the shaft.

Rotation speed measurement systems with phonic wheels can in particular be used to measure the so-called "N1" rating (rotational speed) of the low-pressure spool of a twin spool jet engine. On "direct drive" engines (direct driving of the fan by the low-pressure shaft), this rating N1 is also the rating of the fan. A phonic wheel sensor can also be used to measure the rotation rating N2 of the high-pressure spool of the twin spool jet engine, or the rotation speed of another turning member of the engine.

The sinusoidal alternating signal acquired across the terminals of a variable-reluctance sensor can be converted, by an electronic circuit placed upstream of the engine control unit, into a square signal on which the engine control unit can perform a frequency measurement. The conversion of the sinusoidal signal into a square signal is notably performed by a Schmitt trigger, with a predetermined restart threshold and reset signal. The square signal at the Schmitt trigger output switches to a high value when the input voltage exceeds the reset threshold, and switches to a low value when the input voltage falls below the restart threshold.

Figure 1:
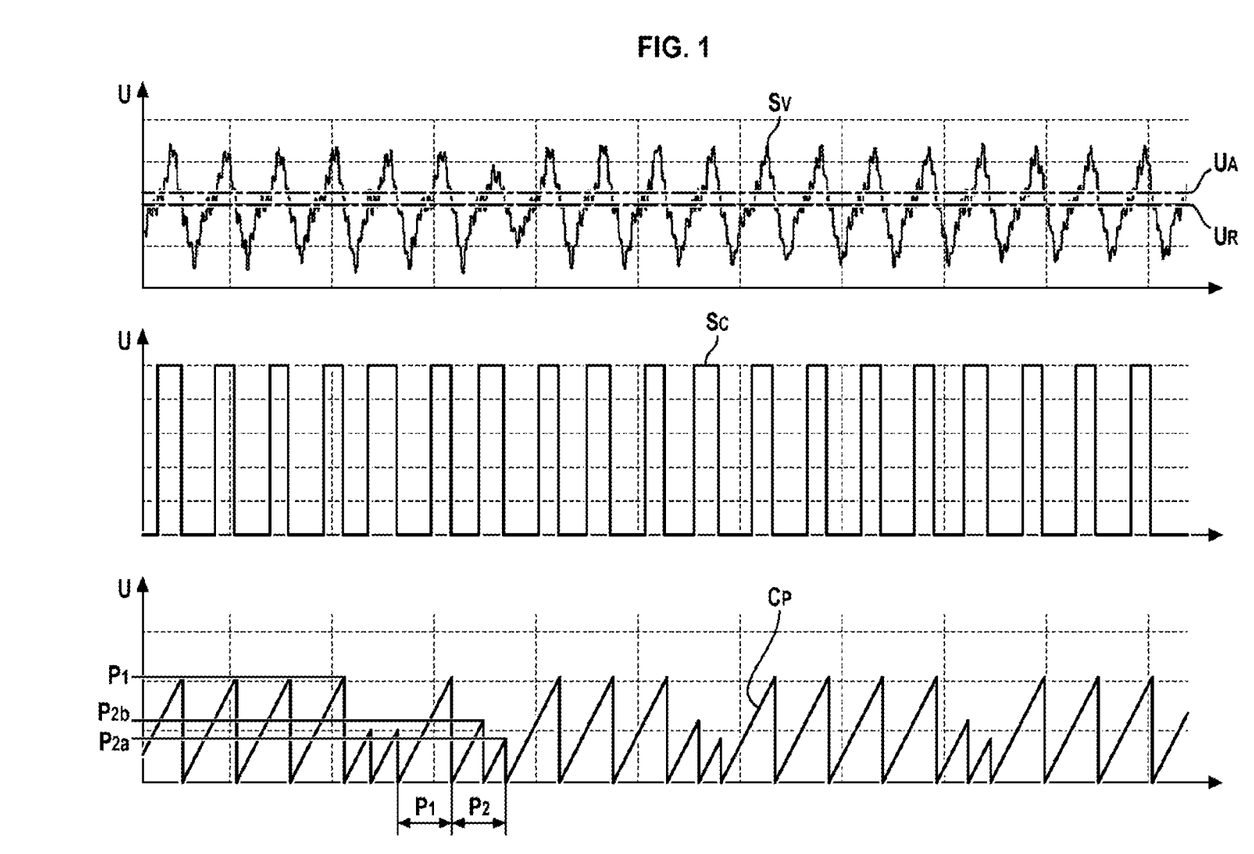

However, the square signal obtained for a phonic wheel rating sensor can be greatly disrupted because of spurious noise. Parts of the sensor can undergo electromagnetic disturbances, due to mechanical vibrations of certain engine parts. It is possible to observe intermittent noise events, but also noise signals of alternating type superimposed over the signal representing the rotation of the phonic wheel (desired signal). In this regard, FIG. 1 illustrates, on a first axis, the voltage Sv across the terminals of the phonic wheel sensor over time, in the case of a signal altered by spurious noise of alternating type of frequency greater than that of the desired signal, and illustrates, on a second axis, the square signal Sc obtained after squaring of the voltage signal Sv, at the trigger output. Since the peak-to-peak voltage of the noise can be locally greater than the difference in voltage between the restart threshold $U_R$ and the reset threshold $U_A$, the alternating noise can cause spurious switchings of the square signal. A third axis illustrates the variations of a signal $C_P$ of counting of the successive periods of the square signal $S_C$ over time. The time delay illustrated by the curve of this third axis is relaunched at each downward switching of the square signal, from the high level to the low level. For example, over the period $P_1$ illustrated in the figure, there is no spurious switching due to noise. On the other hand, over the next period $P_2$, the detected signal $S_V$ crosses the reset threshold $U_A$, then falls again below the restart threshold $U_R$, due to the spurious alternating noise superimposed on the desired signal. The time elapsed between these two passings of the trigger threshold is indeed less than the period $P_1$, which causes successive rapid switchings of the square signal $S_C$, and the detection, in place of a single "full" period $P_2$ which would have been obtained without spurious switching, of two successive "split" periods $P_{2a}$ and $P_{2b}$ of the square signal $S_C$. The rotation speed of the shaft is then disrupted.

A known solution consists in filtering the spurious noise upstream of the electronics that produce the squared signal. This is a low-level solution, implemented upstream of the engine control unit. It is for example common to filter, by a low-pass filter, noises which have a frequency greater than that of the desired signal. However, the low-pass filtering is liable to phase-shift the obtained measurement. A phase-shifted measurement can impede other functions that can be fulfilled by the signal acquired across the terminals of the variable-reluctance sensor, for example an engine balancing function, if the position of the shaft is taken as a reference for the monitoring of other members of the engine. In addition, low-pass filtering can reduce the amplitude of the signal. At constant restart and reset thresholds and at reduced amplitude of the rotation speed measurement signal, the accuracy of the frequency measurement obtained is reduced. This problem is even more relevant at low engine ratings (for example at engine start-up), in which the ratio of the peak-to-peak amplitude of spurious noise of alternating type to the peak-to-peak amplitude of the desired signal can be greater than for a higher engine rating.

Moreover, there are software solutions, implemented at the level of the application system of the digital interface of the engine (for example, a system of FADEC type), performing post-processing of the sinusoidal voltage acquired across the terminals of a variable-reluctance sensor. However, none of the existing solutions is precisely appropriate to the problem of processing a signal that is noisy due to high-frequency alternating noise.

In particular, solutions of the prior art based on a simple averaging of period measurements acquired at earlier times, to determine the period of the passing of the teeth of the phonic wheel at the current time, can only be effective on condition that a sufficient number of non-noisy "full" periods are acquired.

OVERVIEW OF THE INVENTION

The present invention solves the abovementioned problems by the post-processing of the period values detected on the squared signal, it being possible to implement this processing at the level of the software application of the digital interface of the engine, to reconstitute the "desired period" (i.e. the period of the desired signal that would be obtained without spurious noise) based on a set of samples of periods of the squared signal stored in a memory of circular buffer type. This post-processing is based on the observation that in the presence of spurious switchings such as those highlighted on the signal $S_C$ of FIG. 1 shown previously, it is possible to obtain, by taking the sum of several consecutive periods of the signal $S_C$, a value very close to that of the period that would be observed for the desired signal. The method of the invention makes it possible to find the correct sums to take, by performing a number of sums of consecutive period samples and by comparing these sums to likelihood thresholds, computed as a function of the period and rating measurements made previously.

The aim of the invention, according to a first aspect, is a method for measuring the rotation speed of an aircraft engine shaft, comprising the steps of:

acquisition of an alternating rotation speed detection signal, acquired across the terminals of a speed sensor comprising a phonic wheel rotationally driven by the shaft, conversion of said alternating signal into a square signal, the square signal switching to a low voltage level and switching to a high voltage level, corresponding to the passing of the alternating signal voltage below a restart threshold and above a reset threshold respectively, storage, in a memory of circular buffer type, of a plurality of samples of a square signal period, and comparison of each of said samples to a lower period limit and an upper period limit, to determine valid samples, the value of which is included between these two limits;

if the number of valid samples determined is greater than a first threshold, determination on the basis of said valid samples of a desired period of the square signal, and at least on the condition that the number of valid samples is less than the first threshold, determination of the desired period of the signal by the following sub-steps:

computation of a plurality of sums of at least two samples, computation of the average of a set comprising a number of valid period samples and a number of sums from among the plurality of sums of at least two samples, the desired period of the square signal being taken as equal to said average.

The method of the invention does not make it necessary to possess period samples corresponding to full periods of the desired signal. Even if only "split" period samples are possessed due to spurious switchings obtained on the square signal, the method of the invention is capable of finding a period close to that which would be obtained for the desired signal.

The method of the invention has been developed starting from the observation that in the presence of spurious switchings such as those highlighted on the signal $S_C$ of FIG. 1 shown above, it is possible to obtain, by taking the sum of several consecutive periods of the signal $S_C$, a value very close to that of the period that would be observed for the desired signal.

Advantageously, this method can exhibit the following additional features:

The method comprises an additional step of determination, from among the plurality of computed sums of samples, of valid sums of samples which are included between the lower and upper period limits, the computation of the desired period of the square signal being performed by computing the average of the set constituted of the valid period samples and the valid sums of samples;

The samples summed together to determine the valid sums are consecutive samples;

If the sum of the number of valid samples and the number of valid sums of samples is less than a second threshold, the desired period of the square signal is taken as equal to a desired period of the square signal obtained during a previous iteration of the method;

The lower and upper period limits are computed on the basis of a consolidated period value, and a maximum period variation value;

The consolidated period is then taken as equal to a desired period of the square signal obtained at an earlier instant;

The maximum period variation value is then obtained using a maximum rotation speed gradient law, wherein the maximum gradient at a given instant is a function of the rotation speed;

During a phase of initialization of the measurement, a phase during which the number of valid period samples does not exceed a third threshold, or else during which the period samples detected on the square signal are mutually dispersed beyond a predetermined threshold percentage, a desired period of the square signal is estimated by a theoretical numerical model of the rating;

The desired period of the square signal is then determined during the phase of initialization by a numerical model of the rating as a function of thermodynamic parameters of the engine, preferably the value of the high-pressure spool rating, the atmospheric pressure, or the compressor stator shimming.

According to a second aspect, the invention concerns a turbomachine engine control unit configured to implement the steps of the method described hereinabove.

The invention finally concerns, according to a third aspect, a computer program product, intended to be used in an application system of a turbomachine engine control unit, the code instructions of which enable the implementation of a method as above.

OVERVIEW OF FIGURES

FIG. 1 has already been described above.

Other features, aims and advantages of the invention will become apparent from the following description, which is purely illustrative and non-limiting, accompanied by the following additional appended drawings:

DETAILED DESCRIPTION OF EMBODIMENTS

In the entire description hereinafter, an alternating signal $S_V$ is acquired across the terminals of a phonic wheel sensor, for the detection of the rotation speed of the shaft of the low-pressure spool (BP) of a twin spool jet engine. Downstream of the sensor, and upstream of an Electronic Engine Controller (EEC) such as a FADEC3, the signal $S_V$ is converted into a square signal $S_C$. To do this, the signal $S_V$ is here filtered by an RC filter, then clipped, then filtered again, and finally squared by a Schmitt trigger of restart threshold $U_R$ at 0 V and reset threshold $U_A$ at 0.232 V.

Periods of passing of the phonic wheel teeth are measured on the square signal $S_C$ by considering the times elapsed between two downward fronts of the square signal. Here the phonic wheel sensor measures the rating N1 of an engine. However, the same conditions of processing can just as advantageously be used for the measurement of any other rating of a turning member of the engine, such as for example the measurement of the rating N2.

Figure 2:
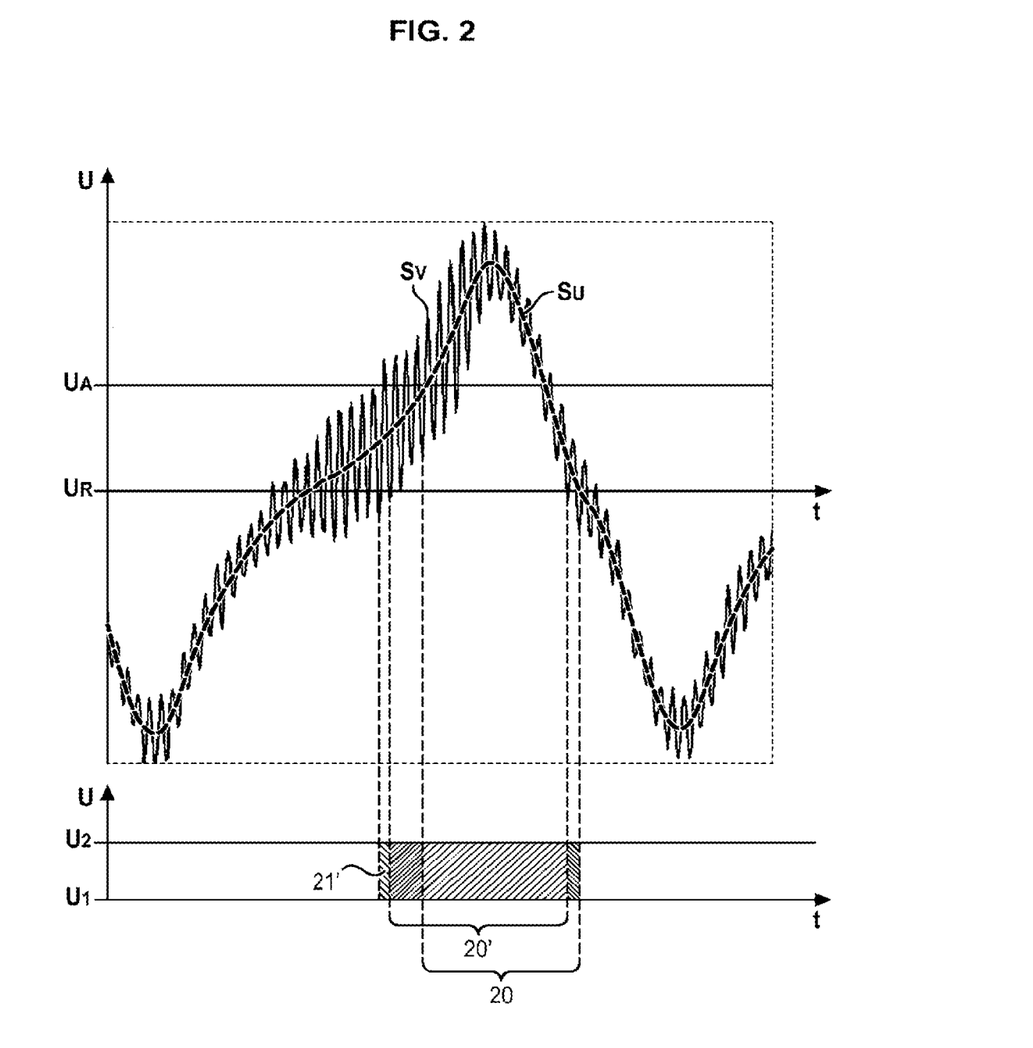
FIG. 2 illustrates, on an example of a noisy signal at the output of a phonic wheel sensor, a number of erroneous detections of square signal periods.

However, as seen above in relation to FIG. 1, the square signal $S_C$ can exhibit switchings which do not correspond to upward or downward fronts for the desired part of the rating detection signal, but which are on the contrary caused by a voltage variation of spurious alternating noise (non-desired part of the signal). This phenomenon is illustrated in FIG. 2. On a first axis, a theoretical voltage signal $S_V$ across the terminals of a phonic wheel sensor is represented as a function of time t. Also represented is the desired part of the signal $S_U$, obtained in a theoretical manner by subtracting from the signal $S_V$ the contribution of the spurious alternating noise. On a second temporal axis is superimposed a square signal associated with the signal $S_V$, and a square signal associated with the theoretical desired signal $S_U$, switching between a low level $U_1$ and a high level $U_2$. Switching of these square signals to the high level $U_2$ occurs when the voltage of the signal $S_V$ exceeds the threshold $U_A$, and switching of these square signals to the low level $U_1$ occurs when the voltage of the signal $S_V$ falls below the threshold $U_R$.

It is observed, on the second axis, that the noisy signal $S_V$ gives, after squaring, an upward front and a downward front corresponding to the part 20', then an upward front and a downward front corresponding to the part 20', whereas the desired signal $S_U$ gives, after squaring, a single upward front and a single downward front corresponding to the part 20. Moreover, the upward and downward fronts of the part 20' do not correspond to the upward and downward fronts of the part 20. Thus, the detection of the period (for example the period between two successive downward fronts of square signal) is erroneous for the noisy signal $S_V$, with respect to the period obtained for the desired signal $S_U$. However, it is the period of the desired signal $S_U$ which is representative of the desired rating N1.

There follows a description of a processing method 10 applied to a plurality of period values $T_1, \ldots, T_n$ acquired on the square signal $S_C$. The method 10 is implemented by an algorithm implemented in the application system of the Electronic Engine Controller (EEC). It is used to reconstitute a consolidated period $P_t$ from the values $T_1, \ldots, T_n$. As a reminder, a period of a square signal $S_C$ is here obtained between two consecutive downward fronts (from the high voltage level $U_2$ to the low voltage level $U_1$) of this square signal. It is not necessary to assume in advance that these periods are "full", i.e. associated with the theoretical desired rating detection signal excluding spurious noise, or "split", i.e. computed between spurious switchings of the signal $S_C$ related to the noise. The method 10 is used to reconstitute a t-th period $P_t$ providing a good approximation of the period of the theoretical desired signal $S_U$. The method 10 is here implemented digitally, at the level of the application software of the EEC digital interface of an aircraft engine.

Figure 3:
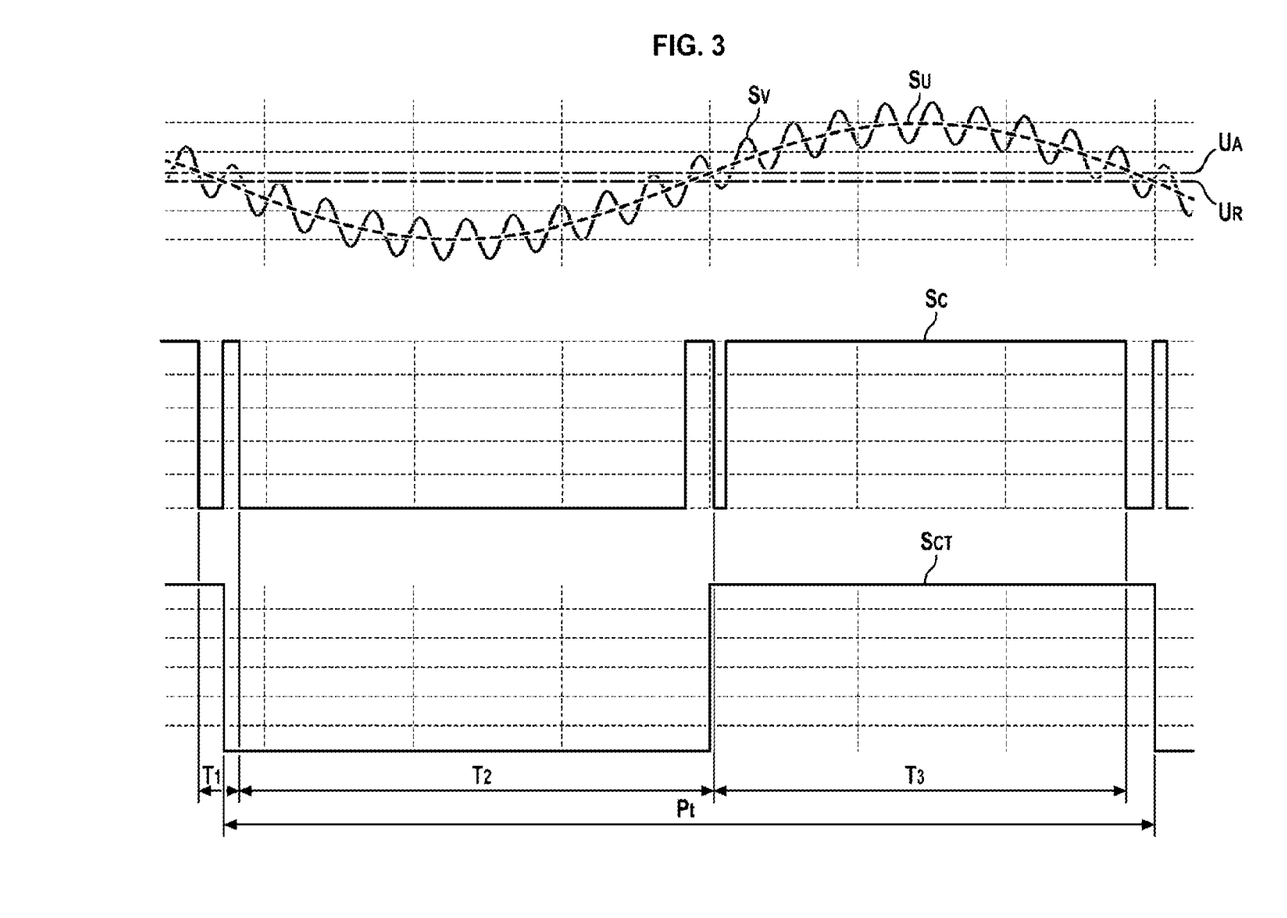
FIG. 3 represents a theoretical voltage signal resulting from the superimposition of a desired signal and sinusoidal alternating-type noise, to illustrate the principle of the addition of period samples.

FIG. 3 is used to explain, using a simplified theoretical example, the objectives and principle of the method 10. On a first axis is represented over time an example of a voltage signal $S_V$, obtained by summing a low-frequency, sinusoidal theoretical desired signal $S_U$, also represented on this first axis, and a higher-frequency noise signal. Also represented is the restart threshold $U_R$ and the reset threshold $U_A$ of a Schmitt trigger used to square the signal $S_V$ and the theoretical signal $S_U$, these latter signals corresponding respectively to the square signal $S_C$, represented in parallel on a second axis, and the theoretical square signal $S_{CT}$, represented in parallel on a third axis. It is observed that the period $P_t$ which would be obtained for the signal $S_{CT}$ is partly superimposed on itself at a first period $T_1$ effectively obtained for the signal $S_C$, then becomes completely superimposed on itself at two following periods $T_2$ and $T_3$, then becomes partly superimposed on itself at a fourth non-referenced period on the FIG. 3.

However, by adding the consecutive periods $T_1$, $T_2$ and $T_3$, a period value is obtained which is very close to the value $P_t$, the latter constituting the desired period for the frequency measurement. One interpretation of this result is that the two downward fronts of $S_C$ respectively marking the beginning of the period $T_1$ and the end of the period $T_3$ correspond approximately to consecutive downward fronts that would be observed by the signal $S_{CT}$, giving the period $P_t$. If an analogy is drawn between this theoretical example and a real case of measurement of a detection signal acquired across the terminals of a phonic wheel sensor, the signal effectively observable across the terminals of the sensor would be the signal $S_V$, giving the square signal $S_C$. One objective of the method 10 is thus to obtain a good approximation of the period $P_t$ obtained with the square signal $S_{CT}$, the period $P_t$ not being directly observable.

There follows a description of the steps of the method 10 for processing period values of a square signal $S_C$ acquired from a rotation speed detection signal $S_V$ taken across the terminals of a phonic wheel sensor, the method 10 being here, as a reminder, implemented by the application software program, or application system, of the digital interface of the Electronic Engine Controller. The steps of the method 10 are hereinafter described in relation to FIG. 4.

Figure 4:
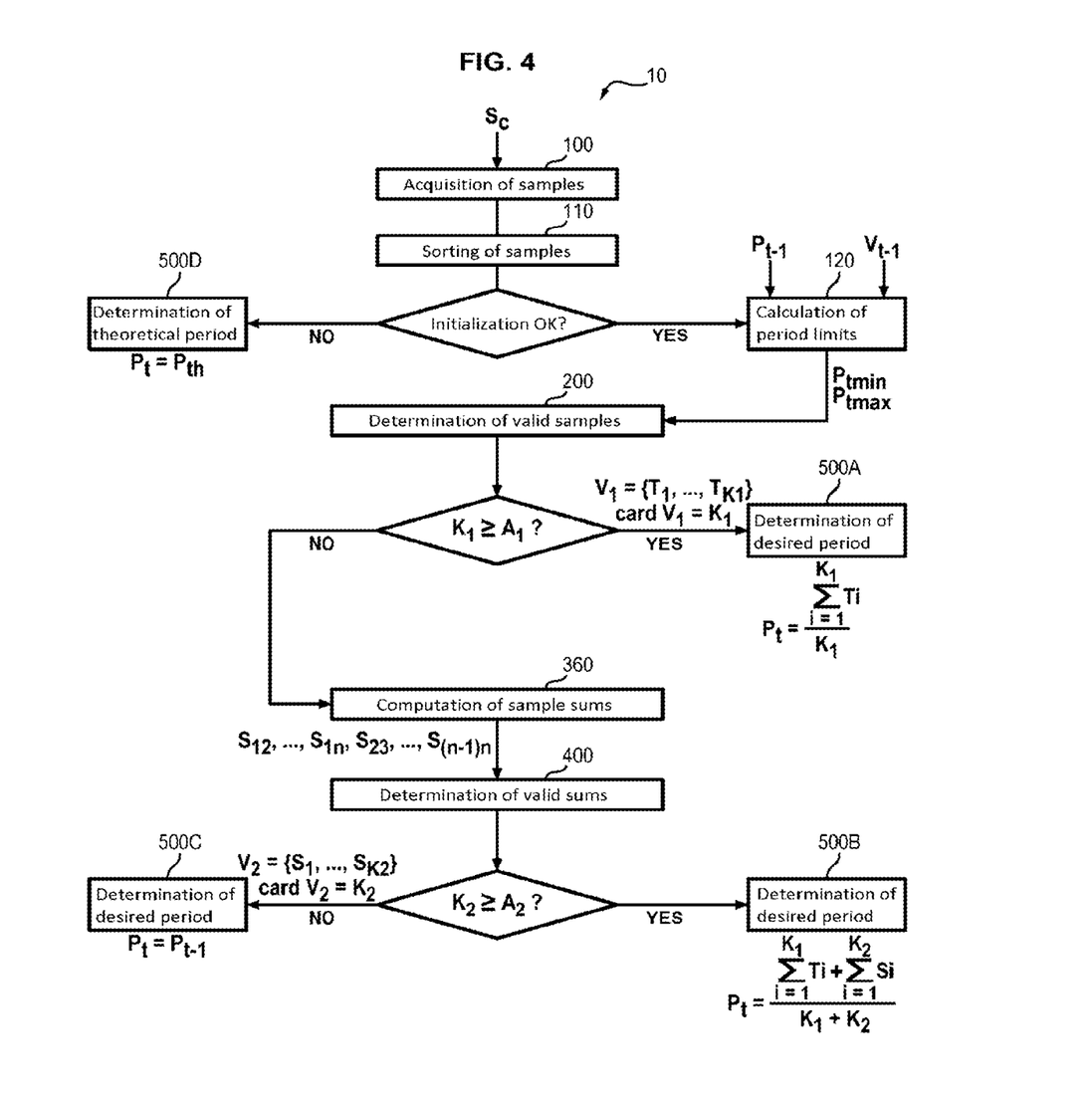
FIG. 4 schematically represents an embodiment of an algorithm for processing period samples acquired in a circular memory to recompute the desired period.

In a step 100, the acquisition of the values $T_1, \ldots, T_n$ of the square signal period samples is carried out in the following way. A first counter detects the downward fronts of a square sampling signal of a high frequency with respect to that expected for the square signal. For example, the measurement board of the periods of passing of the phonic wheel teeth can have a sampling period in the order of $0.25 \cdot 10^{-6}$ s. A second counter detects the downward fronts of the square signal $S_C$. The values of the time elapsed between two consecutive downward fronts of the square signal $S_C$ can thus be stored in a cyclic memory B of circular buffer type, which can keep in memory a certain number of period measurements. It is preferable here to implement the buffer B in the electronic circuit for measurement of the period, instead of a digital implementation in the application system of the digital interface of the Electronic Engine Controller, as the period of computation of this engine controller is typically in the order of 0.015 s and does not allow the accurate measurement of the period of passing of the phonic wheel teeth (the speed whereof can attain 7000 rotations per minute, for 60 teeth). The circular buffer B can then supply the values $T_1, \ldots, T_n$, as well as the measurement dates of these samples, to the application system.

The number, here denoted n, of samples is taken as greater than a minimum number of samples necessary to ensure good accuracy of measurement. The minimum number can correspond, for example, to the number of teeth of the phonic wheel. By taking, in subsequent steps, repeated hereinafter, of the method 10, an average of a number of consecutive samples greater than the number of teeth of the phonic wheel, any disparities between the measurements that would be linked to inhomogeneities in the geometry of the phonic wheel teeth are erased. The expected frequency of the spurious noise, the effect of which it is desirable to reduce, is also involved in the determination of the minimum number of samples per buffer B: the higher the frequency of the noise with respect to the desired signal, the more "split" periods can be necessary to reconstitute, as per the principle described in relation to FIG. 3, a desired period of passing of the phonic wheel teeth.

In a step 110, the samples $T_1, \ldots, T_n$ are then sorted by order of the oldest sample to the most recent. This step 110 makes it possible, in the subsequent steps, to take sums of consecutive periods over time. It is supposed here, for greater convenience, that the sorted samples conserve their order of $T_1$ to $T_n$ after the sort. At the output of step 110, the application system therefore possesses a vector constituted of n samples of consecutive periods.

After step 110, in the present embodiment, there are two distinct scenarios, according to the value of a binary initialization signal which indicates if the period measurement is in an initialized state or not. Specifically, as will be described hereinafter, in the following steps of reconstitution of the consolidated period on the basis of step 120, a consolidated period value obtained at a previous computation increment is taken as input. These steps therefore require at least one consolidated period value deemed satisfactory to have been acquired.

In the present embodiment, a test is performed on the period samples $T_1, \ldots, T_n$ sorted in the buffer B. As an alternative, one could also perform a test for the initialization over unsorted period samples. It is tested whether a certain number of samples among the samples $T_1, \ldots, T_n$ (for example, ten samples), or as an alternative all the samples, are sufficiently mutually coherent, i.e. if their values are weakly dispersed with respect to a predetermined percentage of dispersion threshold D.

For example, if the initialization test requires that three period samples are weakly mutually dispersed, and for a value of the dispersion threshold D equal to 5%, a check is made to see if the logic equation $$100 * \frac{P1 - P2}{P1} < 5\% \text{ AND } 100 * \frac{P2 - P3}{P2} < 5\%$$

is verified.

As an alternative, the initialization test could consist in verifying that a number of period samples from among $T_1, \ldots, T_n$ included in a likelihood interval $[P_{min}, P_{max}]$, wherein the values $P_{min}$ and $P_{max}$ are for example computed using a theoretical model dependent on the operational conditions of the engine, exceeds a predetermined threshold $A_3$.

As long as the initialization test does not give a positive result for an iteration of the method 10, the value of the binary initialization signal stays at zero, and the measurement is considered as non-initialized. During this phase of initialization wherein the measurement is not yet initialized, instead of determining a consolidated period $P_t$ from a previous consolidated period $P_{t-1}$, $P_t$ is computed by a theoretical numerical model $P_{th}$, in a step 500D (modality D of the step 500 of determination of the period $P_t$). The theoretical numerical model $P_{th}$ can correspond to a theoretical model of rating N1 value, as a function of thermodynamic parameters of the engine, such as the rating value of the high-pressure spool, the atmospheric pressure, or the compressor stator shimming. Results obtained during a phase of initialization of the period measurement are described hereinafter, in relation to FIGS. 6 and 7.

If the initialization test turns out to be negative during an excessively long period (relative to a predetermined time), which implies that the signal is very noisy, it is possible to make the value of the binary initialization signal change to 1 and to initialize the algorithm using a value of consolidated period $P_t$ resulting from the theoretical numerical model giving the period $P_{th}$. It is possible to take into account, in the establishment of the likelihood interval $[P_{t\ min}, P_{t\ max}]$ in the following iterations after initialization, a margin of error in the determination of this theoretical period, due to an uncertainty of measurement of the engine rating used in the theoretical model.

If the initialization test gives a positive result, the binary initialization signal is incremented to the value 1. The initialization signal then stays equal to 1 until the end of the measurement of the period of passing of the phonic wheel teeth, and during the following iterations of the method, use is made of the consolidated period values previously obtained. During the iteration of the method wherein the value of the binary initialization signal is incremented to 1, it is possible to compute an initial consolidated period $P_{t0}$ from the samples determined to be mutually coherent. For example, the value $P_{t0}$ can be taken as equal to the arithmetic mean of the period samples deemed mutually coherent. The following step 120 can then be implemented in the following iteration, considering as previous consolidated period value the value $P_{t0}$.

On condition that the period measurement is initialized, after the step 110 of sorting the samples, the method 10 continues in a step 120 of computing a lower limit and an upper limit of the desired period. As an alternative, when the period measurement is initialized, the step 120 can be implemented before the step 110, or in parallel with the step 110. The step 120 consists in establishing a likelihood interval which will then make it possible to determine, among the sorted samples $T_1, \ldots, T_n$, those that can correspond to "full" periods, in other words period samples valid for the measurement of the frequency of passing of the phonic wheel teeth.

Figure 5:
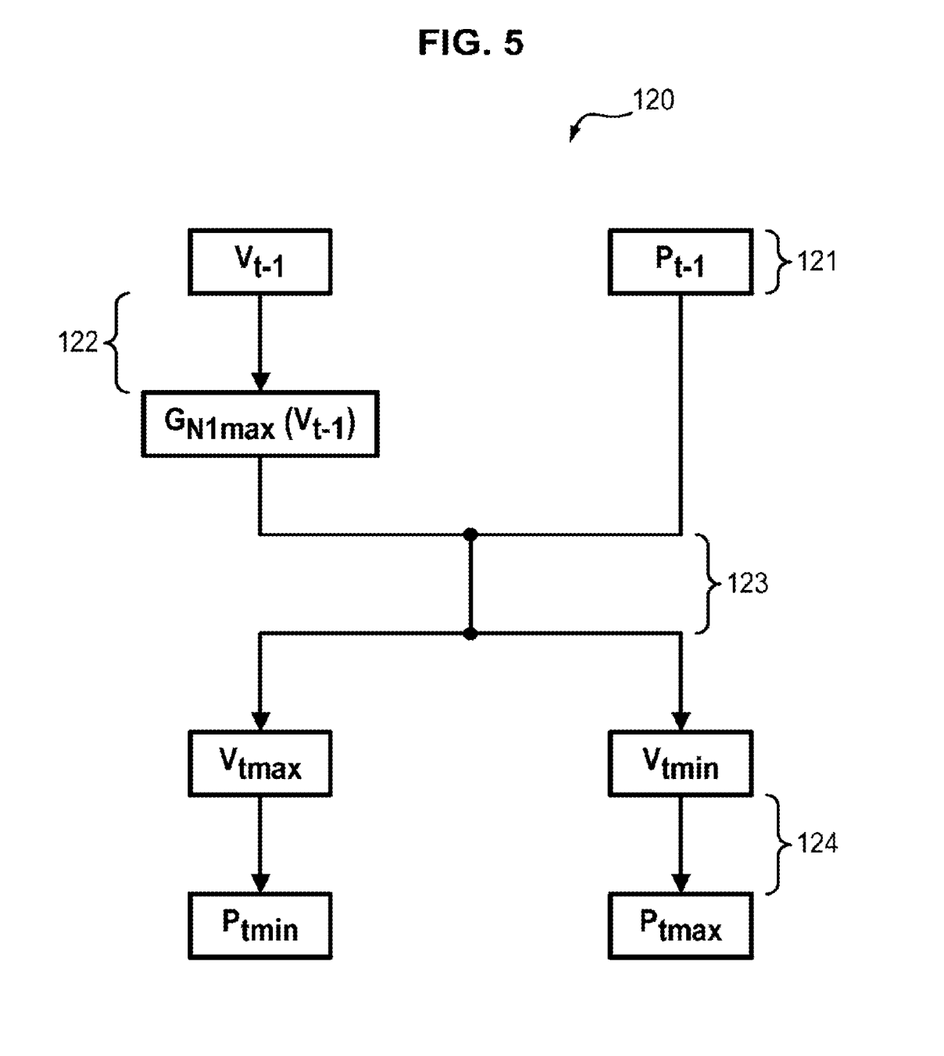
FIG. 5 represents an embodiment of an algorithm for determining a likelihood interval within the algorithm of FIG. 4.

The detail of the algorithm 120 of computation of the likelihood interval for the t-th period $P_t$ of passing of the phonic wheel teeth, delimited by a lower limit $P_{t\ min}$ and an upper limit $P_{t\ max}$, is described in relation to FIG. 5. In a step 121 are acquired the values $P_{t-1}$ and $V_{t-1}$, respectively of the (t−1)-th value of the period of passing of the phonic wheel teeth determined previously using the algorithm 100, and of the (t−1)-th corresponding rotation speed value. The periods are for example expressed in milliseconds, and the rotation speeds are for example expressed in rotations per minute (rpm).

Next, in the step 122, and using a predetermined law of maximum possible gradient of the phonic wheel rotation speed (maximum gradient of the rating N1), the maximum rotation speed gradient is computed for the period $P_t$. The law $G_{N1max}$ can come from engine tests or previous computations. It is here expressed as a function of the rotation speed of the shaft, but can depend on other parameters related to the operational conditions of the engine. The rotation speed gradient can be expressed in rpm per second.

In the step 123, the value $G_{N1max}(V_{t-1})$ obtained is used to obtain the maximum variation in rotation speed over the period $P_t$. Here the maximum gradient value $G_{N1max}(V_{t-1})$ is multiplied by the period $P_{t-1}$ to obtain an estimate of this maximum variation. This maximum variation value is here an absolute value and can lead to an acceleration or to a deceleration of the rotation of the phonic wheel. The speed $V_{t\ max}$ obtained is thus computed by adding this maximum variation to $V_{t-1}$, and the speed $V_{t\ min}$ obtained is computed by subtracting this maximum variation from $V_{t-1}$.

As an alternative, the maximum variation going in the direction of a deceleration (minimal as a relative value) of the rotation speed could be not equal to the opposite of the maximum variation going in the direction of an acceleration.

Finally, in a step 124, from these values of maximum speed $V_{t\ max}$ and minimum speed $V_{t\ min}$ are respectively deducted the values of minimum period $P_{t\ min}$ and maximum period $P_{t\ max}$. First are obtained, from $V_{t\ max}$ and $V_{t\ min}$, the maximum and minimum values of the frequency, respectively $f_{t\ max}$ and $f_{t\ min}$, of the passing of the phonic wheel teeth. For example if the speed is expressed in rpm, a division by 60 is first performed (to obtain values of speed in rotations per second), then the values obtained after division are multiplied by the number of teeth of the phonic wheel, to obtain the maximum and minimum frequencies of passing of the teeth. Finally, to obtain the corresponding periods $P_{t\ min}$ and $P_{t\ max}$, one respectively considers the inverse of the frequencies $f_{t\ max}$ and $f_{t\ min}$, applying a saturation in a known manner to avoid divisions by 0.

Returning here to the diagram of FIG. 4, in a step 200 one determines, among $T_1, \ldots, T_n$ and on the basis of the likelihood interval delimited by the periods $P_{t\ min}$ and $P_{t\ max}$, the valid samples $T_1, \ldots, T_{k1}$ of a value included between the periods $P_{t\ min}$ and $P_{t\ max}$, as well as the number $k_1$ of these valid samples. Here $V_1$ denotes the set of the period samples of the buffer B designated as valid at this stage.

A first threshold value $A_1$ for the number of valid samples is then considered. The number $k_1$ of valid samples (not necessarily consecutive) is compared to the threshold value $A_1$.

If $k_1$ is greater than or equal to $A_1$, it is estimated that enough acquired valid samples are possessed to obtain, by averaging (here by an arithmetic mean, which could alternatively be geometric) the valid samples, a t-th period $P_t$ for the passing of the teeth of the phonic wheel which has a significance for the measurement of the rating N1. In other words, among the samples contained in the buffer B, enough samples are possessed, which are estimated not to come from spurious switchings and correspond to "full" periods. Thus if $k_1$ is greater than or equal to $A_1$, the application system of the Electronic Engine Controller determines in a step 500A (modality A of step 500) that $P_t$ is equal to the arithmetic mean of the $k_1$ valid period samples contained in B.

A threshold value of $A_1$ is chosen that is sufficient to obtain consolidated periods having significance for the frequency measurement, but not too high so as not to excessively complicate the computations and not to overload the memory of the application system. For example, it is advantageous to consider a threshold $A_1$ as being equal to the number of teeth of the phonic wheel or to a multiple of this number of teeth: thus, if certain teeth exhibit geometrical irregularities with respect to other teeth, which would justify inequalities of period in the desired signal (not related to the presence of spurious noise), the algorithm would reduce the effect of these irregularities by taking the average over a number of periods that covers the entire perimeter of the phonic wheel.

If on the other hand, $k_1$ is less than $A_1$, it is necessary to proceed to the next step 300 of computation of sample sums.

As seen previously in relation to FIG. 3, one principle of the addition of several non-valid period samples is to obtain sample sums corresponding to "full" periods of the desired signal, by dispelling the effect of spurious switches due to noise. In practice, the algorithm seeks sums of consecutive samples, the sum value of which is included in the likelihood interval previously determined in step 120, namely between $P_{t\ min}$ and $P_{t\ max}$.

Thus, in the embodiment described here, the algorithm computes, for an index i varying from 1 to n−1 (n being the number elements of the buffer B) and for an index j strictly greater than i and varying from i+1 to n, the sum denoted $S_{ij}$ of the period samples of the buffer B from $T_i$ to $T_j$, it being recalled that the samples $T_1, \ldots, T_n$ have been sorted by order of date in 110. In other words, here all the possible sums of consecutive samples of the buffer B are performed.

Next, in a step 400, are determined, among $S_{12}, \ldots, S_{1n}$, $S_{23}, \ldots, S_{(n-1)n}$ and based on the likelihood interval delimited by the periods $P_{t\ min}$ and $P_{t\ max}$, the valid sums of samples $S_1, \ldots, S_{k2}$ the value of which is included between the periods $P_{t\ min}$ and $P_{t\ max}$, as well as the number $k_2$ of these valid sums of samples. Here $V_2$ denotes the set of sample sums considered valid. As an alternative, it is possible to consider values of lower and upper limit of the likelihood value which would be different from the values determined in step 200, or also as an alternative, it is possible to apply another criterion than that of belonging to the interval $[P_{tmin}, P_{tmax}]$ to select valid sums, or it is possible to not select valid sums.

In a manner similar to the step 400, two cases can be distinguished according to the order relationship between the number $k_2$ and a second threshold $A_2$ for the number of valid period sums. The threshold $A_2$ can be taken as equal to $A_1$. Preferably, the threshold $A_2$ is taken as greater than $A_1$, so that the computation of the consolidated period $P_t$ by averaging of the valid sample sums requires a greater number of valid sums. This is justified as the fact of permitting the use of sample sums (and no longer only period samples) in the computation of the consolidated period reduces the accuracy of the measurement.

If the number $k_2$ of valid sample sums is greater than or equal to the threshold $A_2$, the algorithm determines in the step 500B that the consolidated period $P_t$ is equal to the mean, here arithmetic, of the set constituted of the $k_1$ samples previously determined valid in the step 200, completed by the $k_2$ valid sample sums referenced in the step 400.

This last mode of computation of the consolidated period is very advantageous, as unlike the mode of computation of the step 500A, it does not require the possession of a predetermined number of valid samples taken alone in the buffer B. In other words, the computation of the step 500B can be performed even if the set of acquired period samples in the buffer B, or a great number of them, are "split" and result from spurious switchings. The algorithm reconstitutes, based on incoherent periods taken alone (in view of the rating gradient law used), a desired period for the rating computation, which not only allows better accuracy of the filter output measurement, but also allows the algorithm to function even if no period acquired on the squared signal $S_C$ is "full".

One condition for the consolidated period computation of the step 500B is however to succeed, based on non-valid samples contained in the buffer B, to reconstitute sums of consecutive period samples which are determined to be valid, since they are included in the likelihood interval between $P_{t\,min}$ and $P_{t\,max}$. Preferably, the consolidated period determination algorithm makes provision, if this condition is not fulfilled (i.e. if the period samples acquired in the buffer B are too noisy), for nonetheless attributing a value $P_t$, in such a way as to be able to continue the implementation of the method 10 over following iterations by possessing a consolidated period value $P_t$. Here, if enough valid sums of period samples are not possessed, the period $P_t$ is taken as equal to the consolidated period $P_{t-1}$ determined in the previous iteration, in a step 500C. As a reminder, during the initialization phase wherein a first satisfactory consolidated period value $P_t$ is not possessed, it is possible to apply a theoretical model dependent on the operational conditions of the engine to obtain $P_t$.

Figure 6:
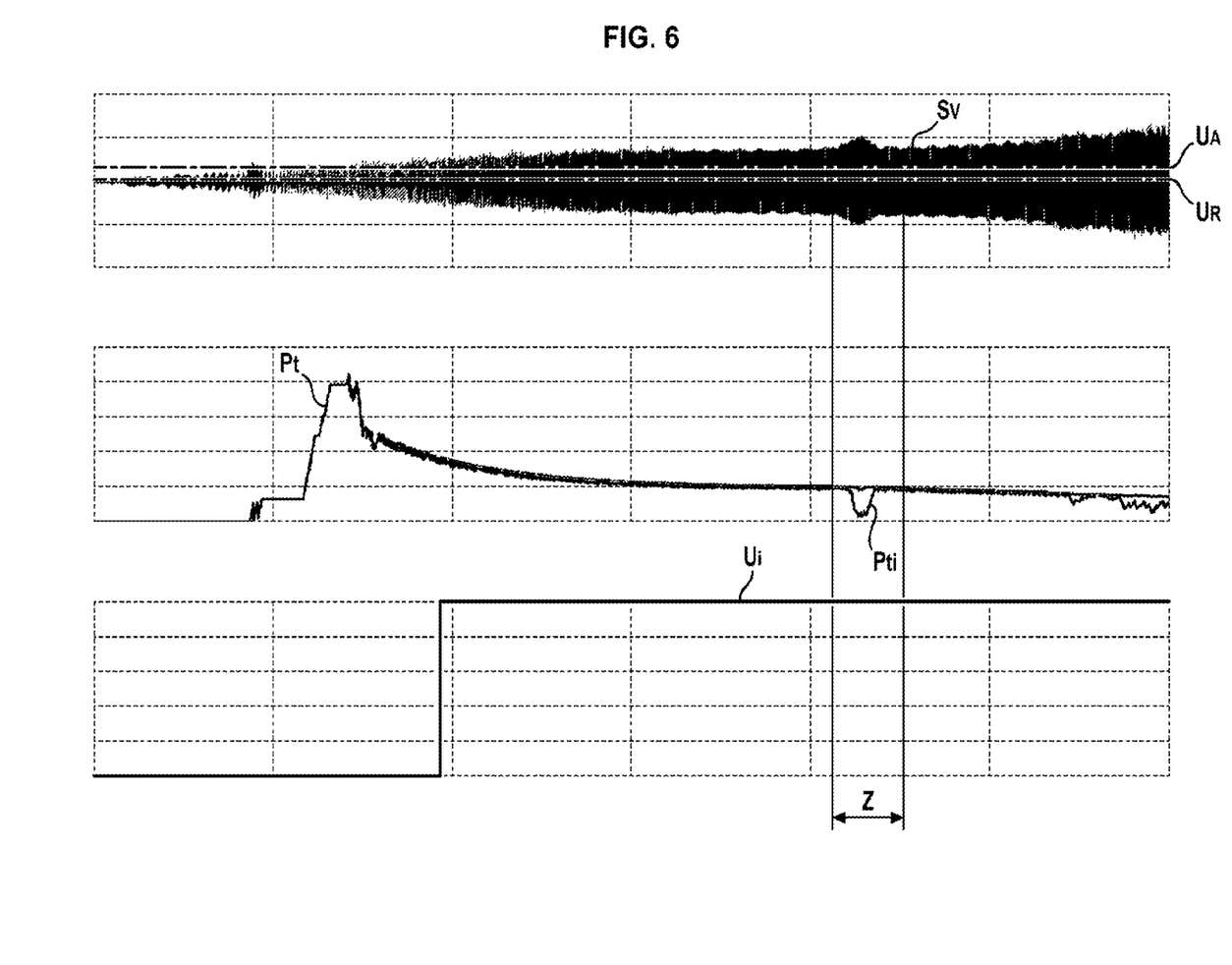
FIG. 6 illustrates the results obtained, with the algorithm illustrated in FIG. 4, on a shaft rotation speed signal, based on a phase of initialization of the measurement and over a duration comprising a restricted time range Z.
Figure 7:
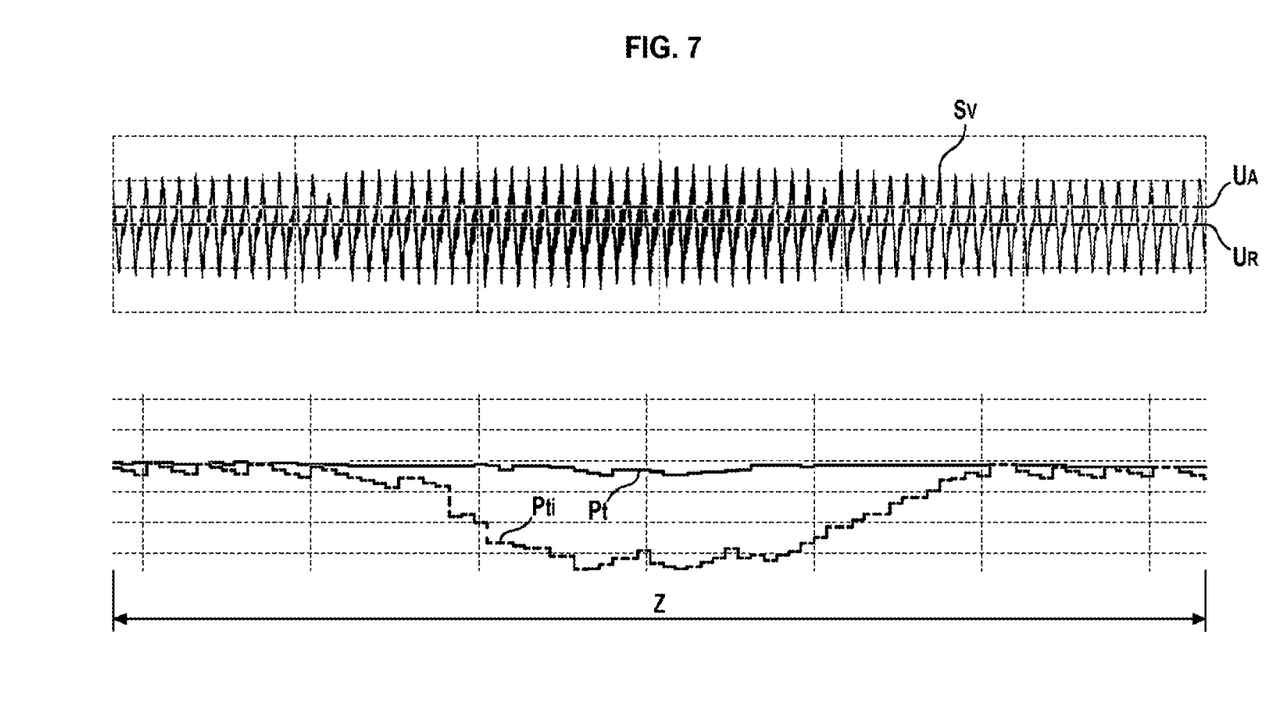
FIG. 7 represents on a shorter time scale, over the range Z, the signals of FIG. 6.

The results obtained by the application of the method 10 to a voltage signal $S_V$ acquired across the terminals of a phonic wheel sensor are illustrated, based on a phase of initialization of the measurement, in FIGS. 6 and 7. These figures represent on a first axis the voltage $S_V$ over time, marking the restart $U_R$ and reset $U_A$ thresholds of the Schmitt trigger performing the squaring of the signal $S_V$. On a second axis are represented in superimposition the consolidated period $P_t$ obtained by the application of the method 10, on the same time scale, and another period value $P_{ti}$ which would be obtained based on the same signal $S_V$ by applying thereto a simple algorithm for averaging period samples. Finally, the third axis illustrates on the same time scale the value of the binary initialization signal $U_1$, computed as per the conditions above.

The value $P_{ti}$ corresponds to a period value obtained without distinguishing between valid samples and non-valid samples (with regard to the criterion explained in step 200), and without taking sums of consecutive period samples measured on a square signal obtained from the signal $S_V$. The algorithm for computing the period $P_{ti}$ (not described in detail here) comprises the same initialization criterion as that involved in the initialization test making it possible to manage the signal $U_I$: the computation of $P_{ti}$ can be initialized if a certain number of period samples are not mutually dispersed beyond the dispersion threshold D. Thus, in FIG. 6, the time abscissae corresponding to a value 0 of the signal $U_I$ (initialization phase) are not associated with a value of $P_{ti}$. On the other hand, during the initialization phase, the method 10 provides values of $P_t$ using the theoretical model $P_{th}$ described above, these values being visible on the second axis of FIG. 6.

Once the measurement is correctly initialized and the signal $U_I$ incremented to the value 1, the value Pti is obtained by taking an arithmetic mean of all the period samples contained in the buffer B. The value Pt, meanwhile, is obtained as per the method 10, therefore by taking the mean of only the valid samples if the algorithm determines a number greater than the first threshold A1, and by taking in the opposite case consecutive sample sums as per the conditions described above. Over a large part of the time range illustrated in FIG. 6, for example the time range wherein the measurement is initialized and which precedes the range referenced as Z, all the samples of the buffer B are determined as valid in the step 200 of the method 10, and the period Pt corresponds to the arithmetic mean of all these samples. Over this time range, the period Pt is therefore equal to the period Pti.

On the other hand, over the range Z, it is observed on the first axis of the FIG. 6 that the maximum amplitude of the signal $S_V$ is greater than for the values of the signal $S_V$ obtained previously. Here this is indicative of spurious noise of alternating type, which is added on top of the desired signal at the time of measurement of the voltage across the terminals of the phonic wheel sensor. Over this range, many period samples among the samples acquired and stored in the circular buffer B are "split" and correspond to spurious switchings of the square signal associated with the signal $S_V$. On FIG. 7 it is possible to see, over a smaller time scale, the curves of the first and second axes of FIG. 6, over the time range Z. The value of $P_{ti}$ is always obtained by taking the arithmetic mean of the same number of period samples, although many of these samples are "split" and correspond to durations much smaller than periods of the desired signal. Thus, when the signal $S_V$ is very noisy, the value of $P_{ti}$ can attain $1.0 \cdot 10^{-5}$ s, whereas it is in the order of $2.0 \cdot 10^{-4}$ s over the measurement time ranges wherein the signal $S_V$ is not very noisy or noiseless. On the other hand, using the algorithm for computing the consolidated period which finds coherent values of desired signal period based on "split" periods stored in the circular buffer B, the value of $P_t$ is almost not reduced over the range Z, as it does not fall below $1.7 \cdot 10^{-4}$ s. The measurement of the period $P_t$ is therefore almost unaffected by the presence of spurious alternating noise over the range Z.

The method 10 described above therefore makes it possible, without having to identify among the switchings of the square signal those that correspond to spurious noise and those that correspond to the desired signal for measurement of the rating N1, to greatly reduce the effect of spurious noise of alternating type on the measurement of the period of passing of the phonic wheel teeth. The measurement of the phonic wheel rotation speed, and therefore the measurement of the rating N1, are thereby made more reliable. This solution, simple to implement in the application system of a digital interface of the engine, is far more effective than a simple averaging of a constant number of period samples, as seen above. Furthermore, this solution is advantageous with respect to the known solutions consisting in applying a low pass-type filter, as it does not affect the accuracy and the sensitivity of measurement and does not cause a phase shift of the signal acquired across the terminals of the phonic wheel sensor.

The invention claimed is:

1. A method for measuring the rotation speed of an aircraft engine shaft from a square signal, the square signal being obtained from an alternating rotation speed detection signal acquired across terminals of a speed sensor, the speed sensor comprising a phonic wheel rotationally driven by the aircraft engine shaft, the square signal switching to a low voltage level and switching to a high voltage level, corresponding to passing of an alternating signal voltage below a restart threshold and above a reset threshold respectively, the method comprising:

storing, in a memory of circular buffer type, of a plurality of samples of a square signal period, comparing each of said samples to a lower period limit and an upper period limit, to determine valid samples, a value of which is included between the lower period limit and the upper period limit; and if a number of valid samples determined is greater than a first threshold, determining a desired period of the square signal based on the valid samples, wherein at least on a condition that the number of valid samples is less than the first threshold, the determining of the desired period of the square signal includes:

computing a plurality of sums of at least two samples, determining, from among said plurality of sums, valid sums of consecutive samples, said valid sums being included between the lower period limit and the upper period limit, and computing an average of a set comprising a number of valid period samples and a number of valid sums of consecutive samples, the desired period of the square signal being taken as equal to said average.

2. The speed measurement method as claimed in claim 1, further comprising determining, from among the plurality of computed sums of samples, valid sums of samples which are included between the lower and upper period limits, the computing of the desired period of the square signal being performed by computing the average of the set constituted of the valid period samples and the sample sums determined to be valid.

3. The speed measurement method as claimed in claim 1, wherein if the sum of the number of valid samples and the number of valid sums of samples is less than a second threshold, the desired period of the square signal is taken as equal to a desired period of the square signal obtained during a previous iteration of the method.

4. The speed measurement method as claimed in claim 1, wherein the lower and upper period limits are computed on the basis of a consolidated period value, and a maximum period variation value.

5. The measurement method as claimed in claim 4, wherein the consolidated period is taken as equal to a desired period of the square signal obtained at an earlier time.

6. The measurement method as claimed in claim 4, wherein the maximum period variation value is obtained using a maximum rotation speed gradient law, wherein the maximum gradient at a given time is a function of the rotation speed.

7. The measurement method as claimed in claim 1, wherein during a phase of initialization of the measurement, a phase during which the number of valid period samples does not exceed a third threshold, a desired period of the square signal is estimated by a theoretical numerical model of the period.

8. The measurement method as claimed in claim 1, wherein during a phase of initialization of the measurement, during which the period samples detected on the square signal are mutually dispersed beyond a predetermined threshold, a desired period of the square signal is estimated by a theoretical numerical model of the period.

9. The measurement method as claimed in claim 7, wherein the desired period of the square signal is determined during the phase of initialization by a numerical model as a function of thermodynamic parameters of the engine, preferably chosen from among the value of the high-pressure spool rating or the value of the rating of another turning member of the engine, the atmospheric pressure, or the compressor stator shimming.

10. An aircraft engine control unit configured to, take as input a square signal:

store, in a memory of circular buffer type, of a plurality of period samples of the square signal, compare each of said samples to a lower period limit and an upper period limit, to determine valid samples, the value of which is included between these two limits, if the number of valid samples determined is greater than a first threshold, determine a desired period of the square signal based on the valid samples, and if the number of valid samples is less than the first threshold, determine the desired period of the square signal by:

computing a plurality of sums of at least two samples, and computing an average of a set comprising a number of valid samples and a number of sums from among the plurality of sums of at least two samples, wherein the desired period of the square signal being taken as equal to said average.

11. A non-transitory computer readable medium including instructions of which enable execution, by a computer, of the method as claimed in claim 1.

* * * * *